Sept. 6, 1960 P. J. H. JANSSEN 2,951,966

CIRCUIT ARRANGEMENT FOR COMPENSATING FOR VARIATIONS IN THE SUPPLY DIRECT VOLTAGE

Filed July 10, 1956

INVENTOR
PETER JOHANNES HUBERTUS JANSSEN

BY Fred M. Vogel
AGENT 2,951,966
Patented Sept. 6, 1960

2,951,966

CIRCUIT ARRANGEMENT FOR COMPENSATING FOR VARIATIONS IN THE SUPPLY DIRECT VOLTAGE

Peter Johannes Hubertus Janssen, Eindhoven, Netherlands, assignor, by mesne assignments, to North American Philips Company, Inc., New York, N.Y., a corporation of Delaware Filed July 10, 1956, Ser. No. 596,863

4 Claims. (Cl. 315—24)

The present invention relates to a circuit arrangement having a plurality of electron discharge tubes supplied from a common direct voltage source. More particularly, the invention relates to a circuit arrangement for use in a receiver, in which a plurality of amplifying tubes is fed from a common direct-voltage source and in which one of these tubes is controlled in a manner such that the direct voltage of the source varies and in which one of the other tubes is a screen-grid tube of a high-frequency mixing stage or an intermediate-frequency stage, an automatic gain control-voltage being fed to the control-grid of the screen-grid tube.

Such circuit arrangements are employed for example in television receivers, in which the majority of the amplifying tubes is fed from the same source, i.e. a rectifying circuit for the alternating voltage of the power source, one of these tubes being the output tube of the frame deflection circuit. The frame deflection coils are included for example via a transformer, in the output circuit of this tube. It is known that the primary winding of the transformer must be traversed by a parabolic current in order to obtain a linear deflection current. In this case the anode circuit of the output tube exhibits large variations of the anode current, which may be of the order of 100 milliamperes. If the smoothing means of the rectifying circuit for the voltage source are of simple nature, the amplitude of the direct voltage from the direct-voltage source will vary due to the large variation of the cathode current of the output tube of the frame deflection circuit and this direct voltage will exhibit a ripple. This ripple of the supply voltage also occurs at the anodes and screen grids of the other tubes fed from the same source. It is particularly troublesome, if it occurs at the screen grid of a high-frequency mixing tube or an intermediate-frequency tube, when the tube concerned operates in the proximity of the cut-off point of its anode-current-grid-voltage characteristic curve, since in this case variations of the screen-grid voltage produce a high conductance modulation of this tube, so that the image signal is modulated to a high extent by this parabolic ripple. This drawback occurs primarily in those screen-grid tubes to which an automatic gain control-voltage is supplied, since in the event of a strong incoming signal in such tubes the working point is displaced under the action of the automatic gain control-voltage, towards the cut-off point of the characteristic curve.

In order to avoid the drawback described a further smoothing of the direct voltage produced may be carried out or a separate source may be used to feed the output tube of the frame deflection circuit. However, these two solutions are comparatively costly.

An object of the present invention is to compensate for the effect of variations in the voltage of a direct voltage supply source on a screen grid tube of an intermediate-frequency stage.

The circuit arrangement according to the invention provides a simple and cheap solution of the aforesaid problem. In accordance with the present invention, a voltage which is proportional to the cathode current of the tube is derived from the cathode circuit of said tube and is superimposed on the automatic gain control-voltage of the screen-grid tube.

In order that the invention may be readily carried into effect, it will now be described more fully with reference to the accompanying drawing, wherein:

Fig. 1 is a schematic diagram of a portion of a television receiver showing in more specific detail only those parts which are necessary for a clear understanding of the present invention.

Figure 1:
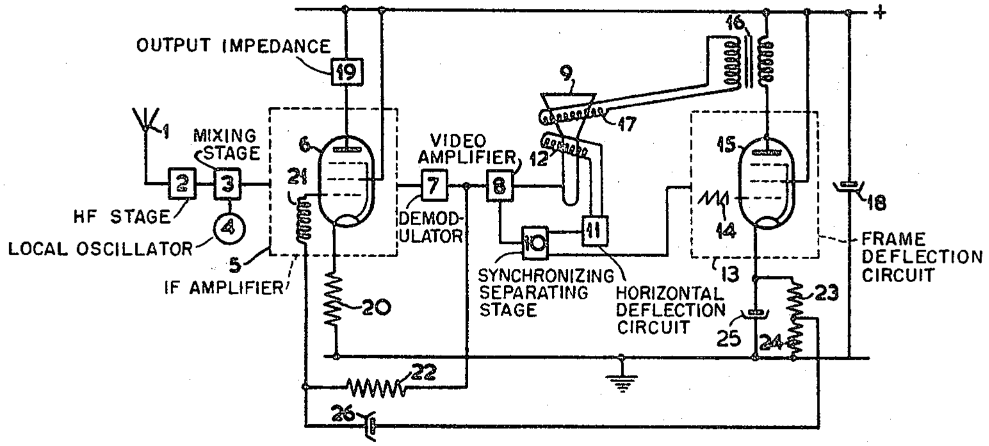
Fig. 1 is a schematic diagram of an embodiment of the circuit arrangement according to the invention, employed in a television receiver.

A television signal is supplied via the aerial 1 to the high-frequency stage 2, after which is provided the mixing stage 3 with the local oscillator 4. The intermediate-frequency signal obtained is fed to the intermediate-frequency amplifier 5, which may be constituted by a plurality of amplifying stages, of which, however, only one screen-grid tube 6 is shown. In the intermediate-frequency amplifier 5 the intermediate-frequency frame signal and the intermediate-frequency sound signal may be separated from one another, or the "intercarrier" sound principle may be applied, which is not essential for the invention. The intermediate-frequency amplifier 5 is connected to the demodulator 7. In the demodulator 7 an automatic gain control voltage is produced in known manner: this voltage may otherwise also be obtained from the video amplifier 8 connected to the demodulator. The output signal of the video amplifier 8 is supplied to a control-electrode of the reproducing tube 9. From the video amplifier 8 are, moreover, obtained the synchronizing signals for synchronizing the horizontal deflection circuit 11 with the deflection coils 12 via the synchronizing separating stage 10, and also the synchronizing signals for synchronizing the frame deflection means 13. The latter deflection means are constituted by an oscillator (not shown) for producing a sawtooth voltage 14, which is fed to the control-grid of the output tube 15 of the frame deflection circuit. In the anode circuit of the tube 15 is included the primary winding of a transformer 16 and the frame deflection coils 17 are connected to the secondary winding of the transformer 16.

A direct current supply is provided for energizing the tubes 6 and 15. This supply is shunted by a smoothing capacitor 18.

The intermediate-frequency amplifying tube 6 is a screen-grid tube, of which the screen-grid is connected to the positive terminal of the supply. The anode circuit of the tube 6 includes an output impedance 19 and the cathode circuit includes a resistor 20. The input voltage for the tube 6 is supplied via the coil 21 in series with the automatic gain control voltage, which is supplied via the resistor 22, to the control-grid of the tube 6.

The cathode circuit of the tube 15 includes the series combination of two resistors 23 and 24, with which series combination the capacitor 25 is connected in parallel. The junction of the resistors 23 and 24 is connected via the separation capacitor 26 to the common point of the resistor 22 and the coil 21 in the control-grid circuit of the screen-grid tube 6.

If in this arrangement, the anode current of the tube 15 increases under the action of the control-grid voltage 14, the direct voltage across the capacitor 18 will drop, since the smoothing means for the direct-voltage source are of simple nature. The voltage across the resistor 24 in the cathode circuit of the tube 15, however, increases and this increase is transmitted to the control-grid of the tube 6. In the tube 6 the anode voltage and the screen-grid voltage drop due to the decrease in the voltage across the smoothing capacitor 18. The anode voltage drop exerts substantially no influence on the conductance of the tube 6. The drop in screen-grid voltage, however, results in a decrease in conductance of the tube. However, since the voltage at the control-grid is increased under the action of the voltage obtained from the resistor 24, the influence of the decrease in mutual conductance of the tube may be obviated, so that the signal occurring across the output impedance 19 is not modulated by the ripple of the supply voltage. It is thus seen that the effect of variations in the voltage of the direct voltage supply source on the screen grid tube is compensated for by the superimposing of a voltage proportional to the cathode current of the other tube on the AGC voltage supplied to the control grid of the screen grid tube and by the supplying of the resultant voltage to the said control grid.

In order to obtain a complete correction, the relationship $$\frac{R_{24}}{R_{23}+R_{24}}\cdot\frac{C_{18}}{C_{25}}=\frac{1}{\mu_{21}}$$

must be fulfilled, wherein $R_{23}$ and $R_{24}$ designate the values of the resistors 23 and 24 in ohms, $C_{18}$ and $C_{25}$ designate the capacitance values of the capacitors 18 and 25 in farads and $\mu_{21}$ designates the voltage amplification factor of the screen-grid of the tube 6 relative to the control-grid of said tube. If, for example, $C_{18}$ is 50 microfarads, $C_{25}$ is 100 microfarads and $\mu_{21}$ is 40, it is found that $$\frac{R_{23}}{R_{24}}$$

is 19, so that, for example, $R_{24}$ is 22 ohms and $R_{23}$ is 418 ohms.

Figure 2:
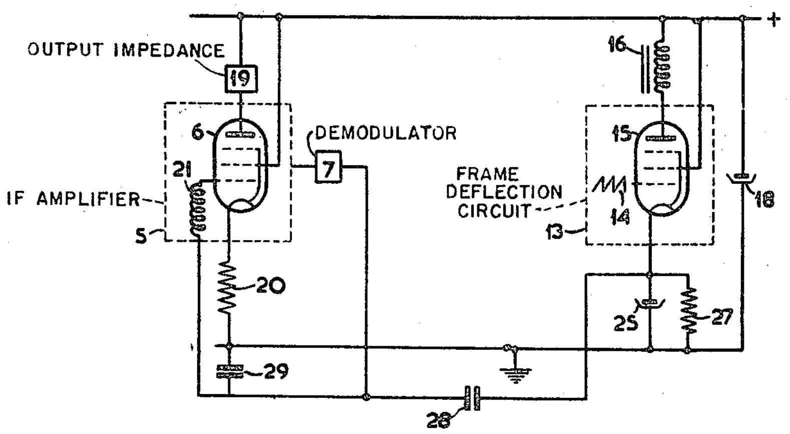
Fig. 2 is a modification of the embodiment of Fig. 1.

In the circuit arrangement shown in Fig. 2 only those parts are shown which are necessary for a clear understanding of the present invention; as far as they correspond to parts shown in Fig. 1, their reference numerals are the same.

In the circuit arrangement of Fig. 2 the cathode lead of the tube 15 includes the parallel combination of the resistor 27 and a capacitor 25. The voltage across this parallel combination is supplied to a capacitative potentiometer, constituted by the capacitor 28 and the capacitor 29, the latter serving at the same time as a smoothing capacitor for the automatic gain control voltage obtained from the demodulator stage 7. In this manner an additional tapping point of the cathode resistor of the tube 15 for voltage division is avoided. In this case a complete correction requires that the condition:

$$\frac{\frac{1}{C_{29}}}{\frac{1}{C_{28}}+\frac{1}{C_{29}}}\cdot\frac{C_{18}}{C_{25}}=\frac{1}{\mu_{21}}$$

be fulfilled, wherein $C_{28}$ and $C_{29}$ designate the capacities of the capacitors 28 and 29 in farads.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement including a CR tube frame deflection circuit, comprising an intermediate frequency stage including a first electron discharge tube having a screen grid and a control grid, a second electron discharge tube having a cathode in said frame deflection circuit, a cathode circuit connected to the cathode of said second tube, a source of direct voltage, means for supplying the voltage from said source to said first and second tubes, means for controlling said second tube in a manner whereby the direct voltage of said source may substantially vary, means for deriving an automatic gain control voltage from said intermediate frequency stage, means for supplying said automatic gain control voltage to the control grid of said first tube, means connected in said cathode circuit for deriving a voltage substantially proportional to variations of the current in said second tube, and means for superimposing said last-mentioned voltage on said automatic gain control voltage supplied to said control grid and for supplying the resultant voltage to the said conrtol grid thereby to compensate for the effect on said first tube of variations in the voltage of said source resulting from variations of the current in said second tube.

2. A circuit arrangement including a CR tube frame deflection circuit, comprising an intermediate frequency stage including a first electron discharge tube having a screen grid and a control grid, a second electron discharge tube having a cathode in said frame deflection circuit, a cathode circuit connected to the cathode of said second tube, a source of direct voltage, means for supplying the voltage from said source to said first and second tubes, means for controlling said second tube in a manner whereby the direct voltage of said source may substantially vary, means for deriving an automatic gain control voltage from said intermediate frequency stage, means for supplying said automatic gain control voltage to the control grid of said first tube, means connected in said cathode circuit for deriving a voltage proportional to variations of the current in said second tube, said last-mentioned voltage being substantially equal to the variation in the voltage of said source divided by the voltage amplification factor of said screen grid relative to said control grid, and means for superimposing said last-mentioned voltage on said automatic gain control voltage supplied to said control grid and for supplying the resultant voltage to the said control grid thereby to compensate for the effect on said first tube of variations in the voltage of said source resulting from variations of the current in said second tube.

3. A circuit arrangement including a CR tube frame deflection circuit, comprising an intermediate frequency stage including a first electron discharge tube having a screen grid and a control grid, a second electron discharge tube having a cathode in said frame deflection circuit, a cathode circuit connected to the cathode of said second tube, a source of direct voltage, means for supplying the voltage from said source to said first and second tubes, means for controlling said second tube in a manner whereby the direct voltage of said source may substantially vary, means for deriving an automatic gain control voltage from said intermediate frequency stage, means for supplying said automatic gain control voltage to the control grid of said first tube, means connected in said cathode circuit for deriving a voltage proportional to variations of the current in said second tube, said last-mentioned means comprising a capacitor and a resistor connected in parallel with said capacitor, said resistor having a tapping point intermediate its end terminals, and means for superimposing said last-mentioned voltage on said automatic gain control voltage supplied to said control grid and for supplying the resultant voltage to the said control grid thereby to compensate for the effect on said first tube of variations in the voltage of said source resulting from variations of the current in said second tube, said last-mentioned means being connected to said tapping point.

4. A circuit arrangement including a CR tube frame deflection circuit, comprising an intermediate frequency stage including a first electron discharge tube having a screen grid and a control grid, a second electron discharge tube having a cathode in said frame deflection circuit, a cathode circuit connected to the cathode of said second tube, a source of direct voltage, means for supplying the voltage from said source to said first and second tubes, means controlling said second tube in a manner whereby the direct voltage of said source may substantially vary, means for deriving an automatic gain control voltage from said intermediate frequency stage, means for supplying said automatic gain control voltage to the control grid of said first tube, means connected in said cathode circuit for deriving a voltage proportional to variations of the current in said second tube, said last-mentioned means comprising a capacitor and a resistor connected in parallel with said capacitor, and means for superimposing said last-mentioned voltage on said automatic gain control voltage supplied to said control grid and for supplying the resultant voltage to the said control grid thereby to compensate for the effect on said first tube of variations in the voltage of said source resulting from variations of the current on said second tube, said last-mentioned means including a portion of a capacitive potentiometer.

References Cited in the file of this patent

UNITED STATES PATENTS

| | | |
|---|---|---|
| 1,990,512 | Aiken | Feb. 12, 1935 |
| 2,014,520 | Carter | Sept. 17, 1935 |
| 2,146,761 | Philpott | Feb. 14, 1939 |
| 2,223,188 | Shofstall | Nov. 26, 1940 |
| 2,346,545 | Anderson | Apr. 11, 1944 |
| 2,525,698 | Mackenzie | Oct. 10, 1950 |
| 2,653,226 | Mattingly | Sept. 22, 1953 |